United States Patent [19]

Lange

[11] 4,373,738
[45] Feb. 15, 1983

[54] STEERABLE AUXILIARY WHEEL ASSEMBLY FOR VEHICLES

[76] Inventor: Dennis M. Lange, 3016 S. Sylvania Ave., Sturtevant, Wis.

[21] Appl. No.: 369,933

[22] Filed: Apr. 19, 1982

Related U.S. Application Data

[63] Continuation-in-part of Ser. No. 144,182, Apr. 28, 1980, abandoned.

[51] Int. Cl.³ ............................................ B62D 13/00
[52] U.S. Cl. ................................. 280/81.5; 280/81 A; 280/94; 280/704; 180/22
[58] Field of Search ................. 280/81 R, 81 A, 81.5, 280/81 B, 704, 86, 90, 94, 704; 180/22; 301/127; 414/495

[56] References Cited

U.S. PATENT DOCUMENTS

| | | | |
|---|---|---|---|
| 3,390,895 | 7/1968 | Verdi | 180/22 |
| 3,420,542 | 1/1969 | Jordan | 280/90 |
| 3,477,738 | 11/1969 | Manning | 180/22 |
| 3,704,896 | 12/1972 | Buelow | 280/81 A |
| 3,771,812 | 11/1973 | Pierce | 280/704 |
| 3,895,818 | 7/1975 | Fearon | 280/81 A |
| 3,920,262 | 11/1975 | Shaw | 280/94 |
| 4,082,305 | 4/1978 | Allison | 280/704 |
| 4,084,833 | 4/1978 | Mohrbacker | 280/81 A |
| 4,213,626 | 7/1980 | Moore | 280/94 |

FOREIGN PATENT DOCUMENTS

961516 1/1975 Canada .

*Primary Examiner*—Robert R. Song
*Attorney, Agent, or Firm*—Michael, Best & Friedrich

[57] ABSTRACT

The auxiliary wheel assembly includes a transverse axle member extending below the vehicle frame members, either forwardly or rearwardly of the vehicle rear wheels, a king pin assembly on each of the outer end portions of the axle member, an auxiliary wheel rotatably mounted on each of the king pin assemblies for steering movement and a tie rod interconnecting the auxiliary wheels so they steer together. The axle member is carried on one end of a pair of laterally spaced arms, the other end of which is pivotally mounted on the vehicle frame member between an operating position and a retracted position. The axle member has a generally U-shape with a central portion and upwardly offset outer end portions carrying the king pin assemblies so that the axle member can be retracted to a location with the central portion immediately adjacent to and the rotational axis of the auxiliary wheels located above the bottom edges of the vehicle frame members to thereby provide above-the-ground clearance of 11-12 inches or more. In one embodiment, the auxiliary wheels are connected to the vehicle front wheels through a hydraulic actuation system which is arranged so that the auxiliary wheels are steered along with the vehicle front wheels.

9 Claims, 11 Drawing Figures

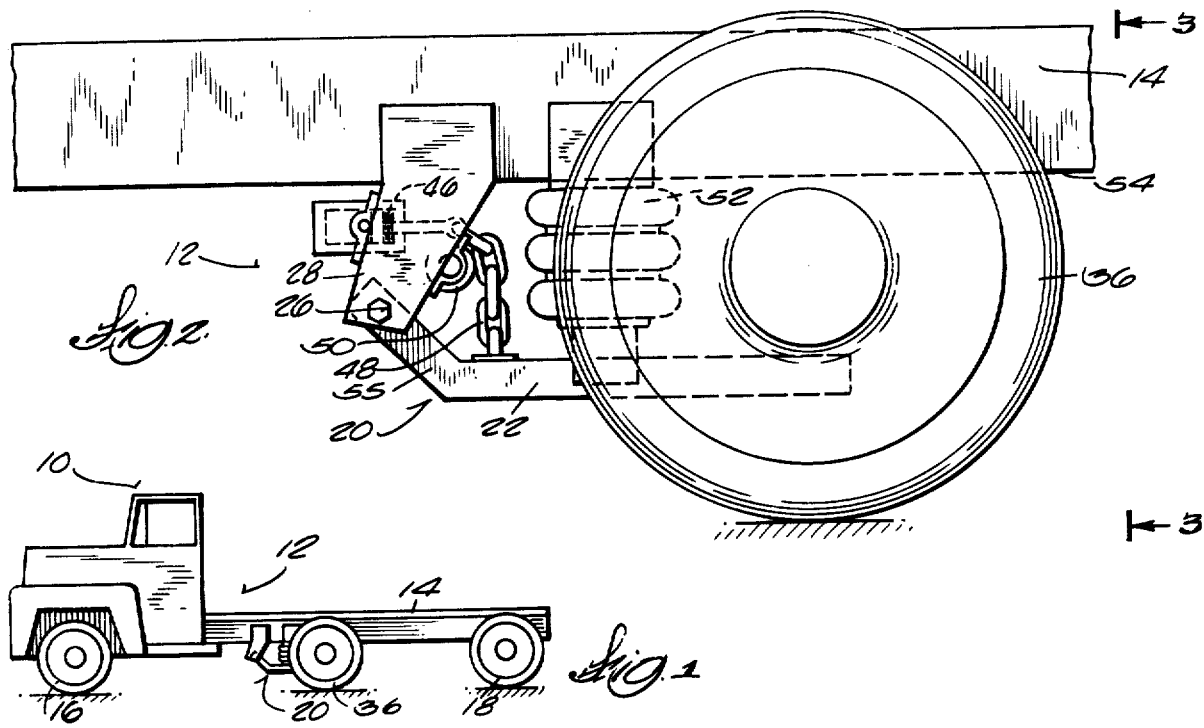
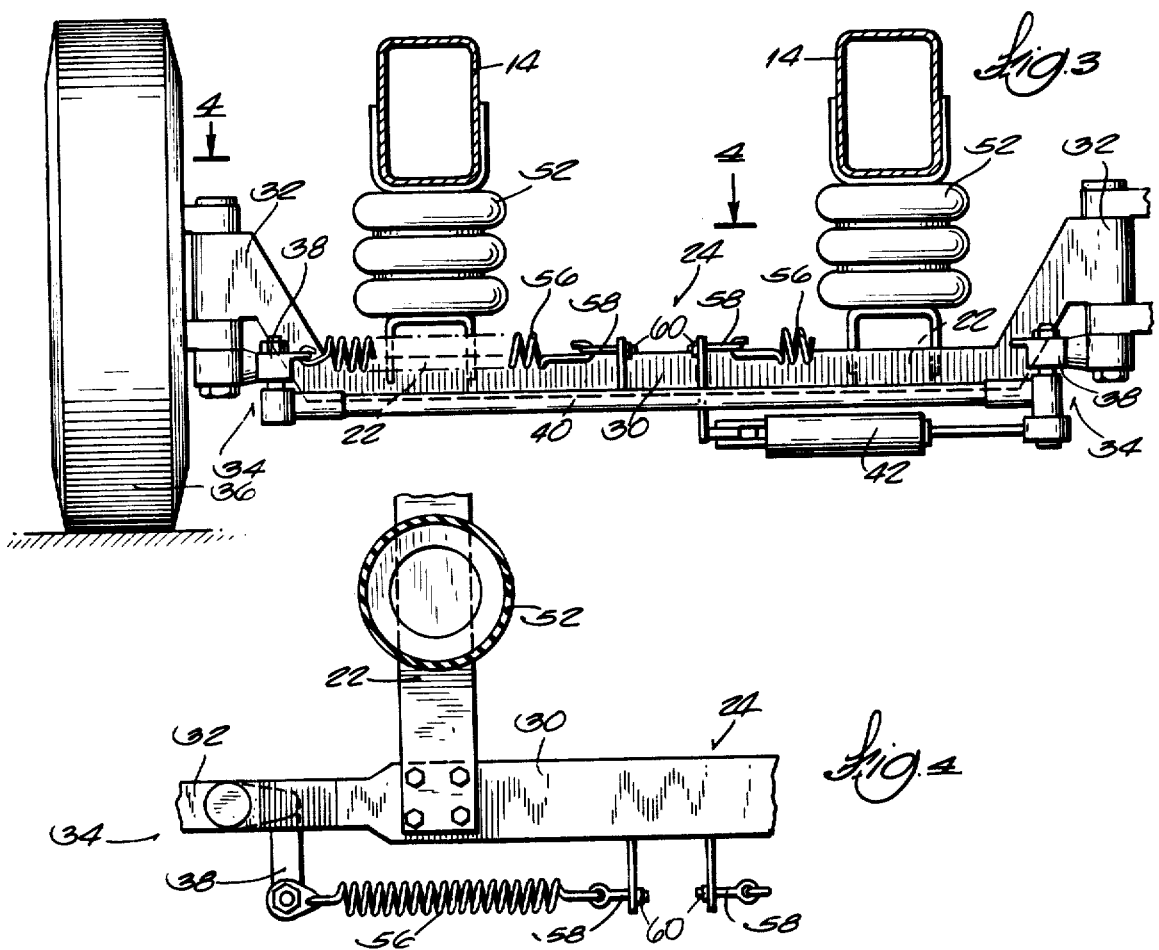

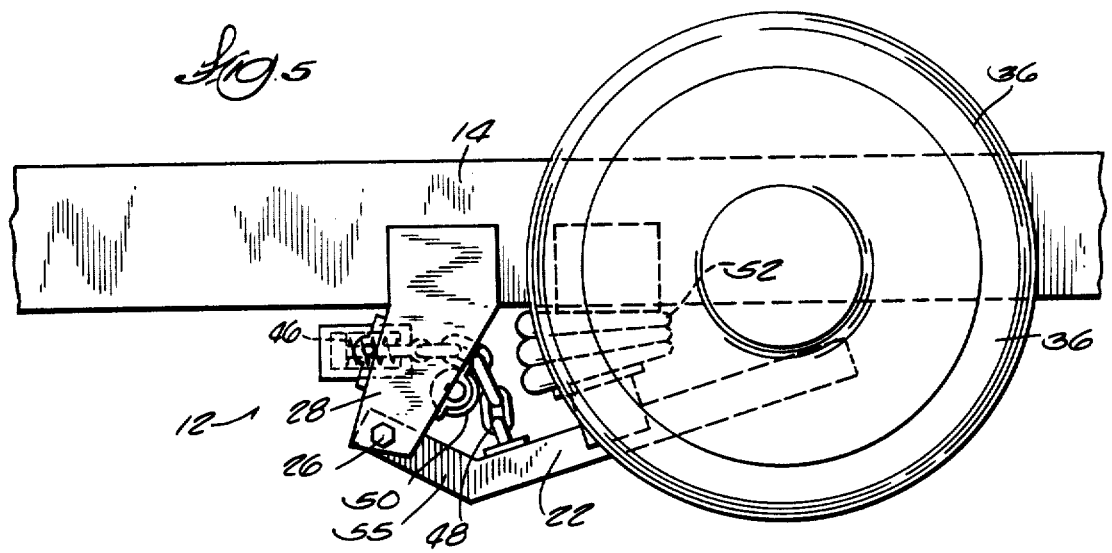
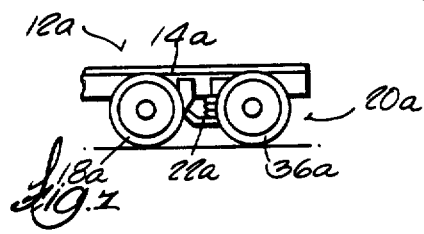
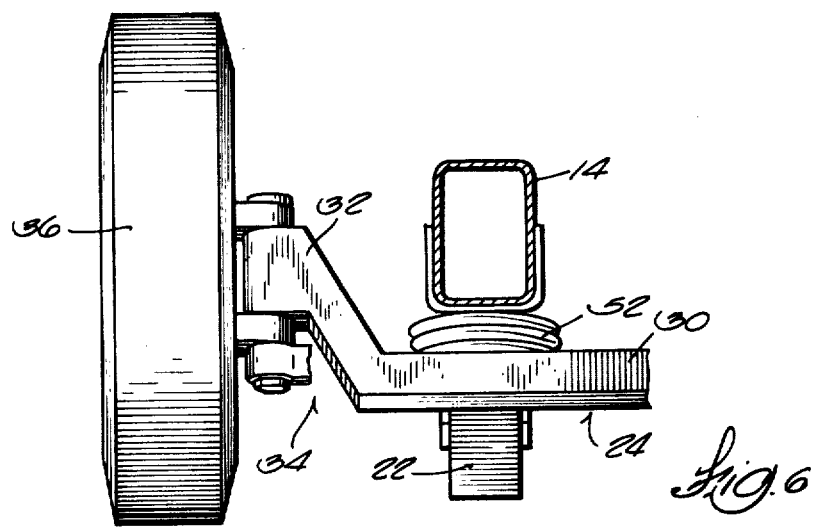

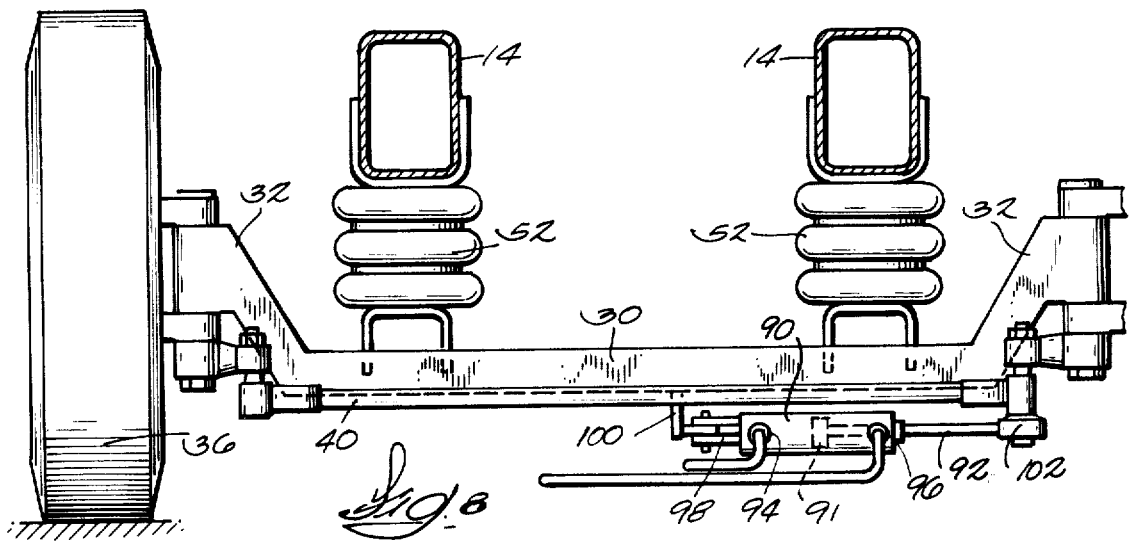
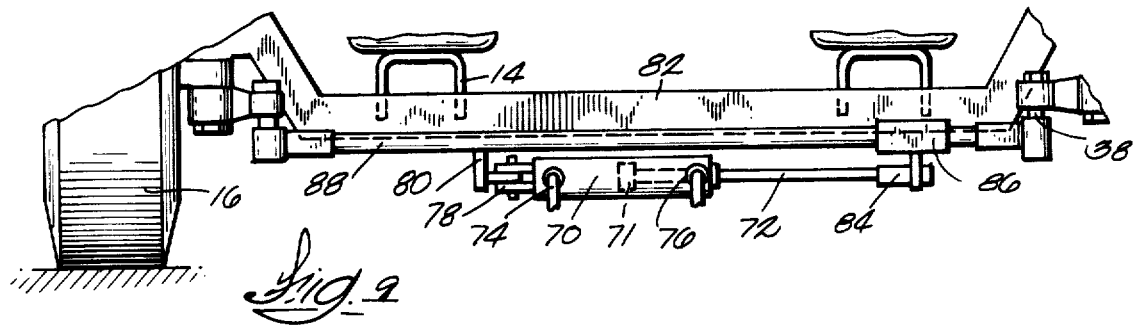
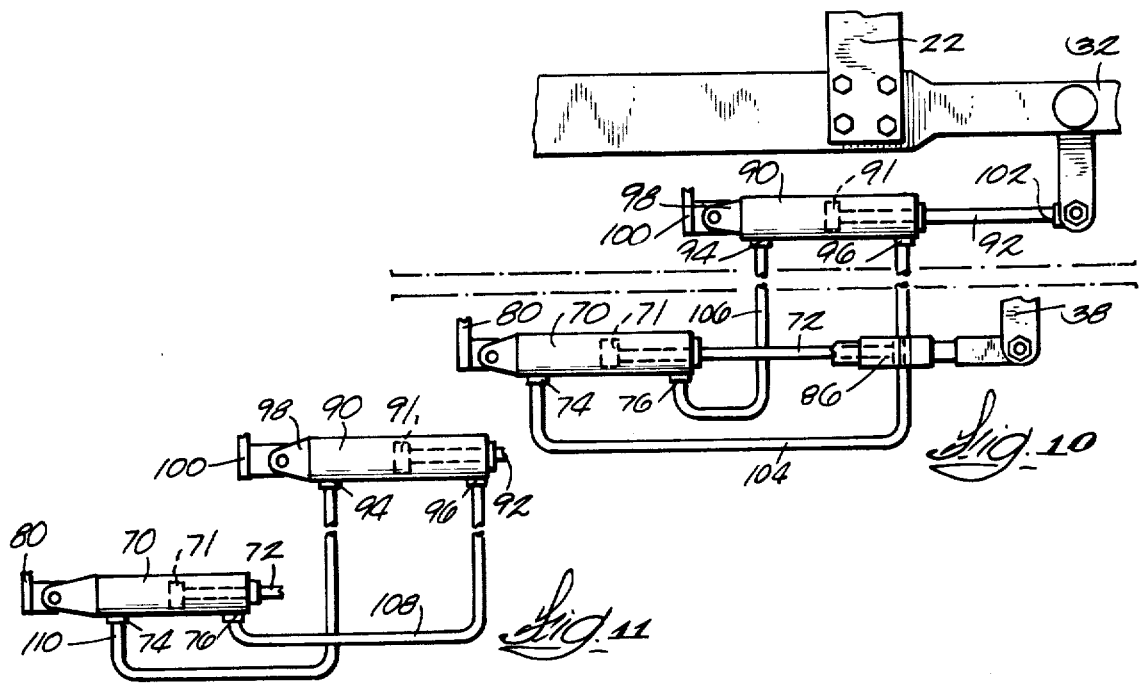

STEERABLE AUXILIARY WHEEL ASSEMBLY FOR VEHICLES

CROSS REFERENCE TO RELATED APPLICATION

This is a continuation-in-part of Application Ser. No. 144,182 filed Apr. 28, 1980, now abandoned.

BACKGROUND OF THE INVENTION

This invention relates to auxiliary wheel assemblies for over-the-road vehicles, such as trucks, which can be lowered to serve as an additional load bearing axle when required to meet highway regulations.

Auxiliary wheel assemblies are commonly used for load distribution purposes on trucks used for hauling heavy loads, both tractor-trailer combinations and trucks. When dead-heading, hauling a light load or a tractor is driven alone, such auxiliary wheel assemblies typically are arranged so that the auxiliary wheels can be raised out of contact with the ground to eliminate unnecessary tire wear.

In many instances, the applicable government regulations require the axle for the auxiliary wheels to be spaced some distance from the rear or drive wheels. Such spacing can cause a certain amount of lateral slippage or tire scuffing when curves and corners are being negotiated. This problem can be minimized by making the auxiliary wheels steerable. If the auxiliary wheels happen to be turned when they are lowered, tire scuffing and other damage to the assembly can occur during initial movement of the truck before the wheels are straightened. This is particularly true in the event the auxiliary wheels are in a severely turned position.

Pressurized air bags or springs are particularly desirable for use in suspension systems for auxiliary wheel assemblies because of their capability of providing a substantially constant force on the auxiliary axle. Such air springs typically are located between the longitudinal members of the truck frame and the auxiliary axle which quite often is the most convenient location from the standpoint of simplifying the mounting structure and the amount of space required. However, when the air springs are so located in prior constructions, they tend to limit the extent the auxiliary wheels can be raised above the ground to only a few inches. Consequently, when the truck is being driven over the uneven ground with the auxiliary wheels raised, they can contact high areas and lift the vehicle, in which case the steering or drive wheels can become ineffective because they are not in firm contact with the ground.

Exemplary prior constructions of auxiliary wheel assemblies including steerable wheels and/or air bag type suspension systems are disclosed in U.S. Pat. Nos. 3,390,895, 3,447,738, 3,704,896, 3,771,812, 3,895,818 and 4,084,833 and Canadian Pat. No. 961,516. None of these patents is concerned with the problem of the auxiliary wheels being turned when lowered into contact with the ground.

With respect to increasing clearance, U.S. Pat. No. 3,704,896 proposes locating the air bags beside the longitudinal frame members and making them longer in order to increase the distance the auxiliary wheels can be raised above the ground. U.S. Pat. No. 4,082,305 proposes arranging the auxiliary wheel assembly so that the axle thereof rides behind the rear end of the vehicle frame and can be lifted above the lower edges of the vehicle frame to provide additional clearance.

U.S. Pat. Nos. 3,420,542, 3,920,262 and 4,213,626 respectively disclose a damper for the front steering wheels of a vehicle, a spring arrangement for counteracting the tendency for vehicle steerable wheels to bow outwardly under weight, and a spring arrangement for maintaining vehicle steerable wheels in a neutral roadway traveling position to compensate for misalignment due to wear to the steering components.

Another common shortcoming of prior steerable auxiliary wheel assemblies is a tendency of the auxiliary wheels to turn in the wrong direction or become "jackknifed" during backing. That is, for auxiliary wheel assemblies located in front of the vehicle drive wheels, the auxiliary wheels tend to become turned to the left when the vehicle is being backed with the front wheels turned to the right and vice-versa. For auxiliary wheel assemblies located behind the vehicle drive wheels, the auxiliary wheels tend to become turned in the same direction as the front wheels during backing instead of the following the rear wheels. Consequently, it is usually necessary to raise the auxiliary wheel assembly before backing.

SUMMARY OF THE INVENTION

One of the principal objects of the invention is to provide a steerable auxiliary wheel assembly which can be operated with minimum of unnecessary tire wear.

Another of the principal objects of the invention is to provide a steerable auxiliary wheel assembly which can be raised to a retracted position when not needed and includes means for insuring that the wheels are in a straight-ahead position when the assembly is returned to an operating position.

A further of the principal objects of the invention is to provide a steerable auxiliary wheel assembly which is arranged so that the wheels turn in response to steering movement of the vehicle front wheels.

A still further of the principal objects of the invention is to provide a steerable auxiliary wheel assembly which can be moved to a retracted position wherein the clearance between the wheels and the ground is sufficient to substantially eliminate accidental contact with high areas.

Other objects, aspects and advantages of the invention will become apparent to those skilled in the art upon reviewing the following detailed description and the appended claims.

The auxiliary wheel assembly provided by the invention includes a transverse axle member extending below the vehicle frame and located either forwardly or rearwardly of the vehicle rear drive wheels, a king pin assembly on each of the opposite ends of the axle member, an auxiliary wheel rotatably mounted on each of the king pin assemblies for steering movement, and means interconnecting the auxiliary wheels so they steer together. The axle member is mounted on the vehicle frame for movement by an actuation means between an operating position wherein the auxiliary wheels are in engagement with the ground and a retracted position wherein they are raised above the ground. The axle member has a generally U-shape with a central portion extending laterally outwardly from the vehicle frame members and outer end portions upwardly from the vehicle frame members and outer end portions upwardly offset from the central portion. Each of the outer end portions of the axle member carries a king pin assembly and the central portion permits the axle member to be retracted to a location immediately adjacent the bottom edges of the vehicle frame members with the rotational axis of the auxiliary wheels located above the bottom edges of the vehicle frame members.

In one embodiment, the auxiliary wheels are connected with the front or steerable wheels of the vehicle through an actuation system which is operable to steer the auxiliary wheels in response to the steering movement of the vehicle front wheels. This actuation means can comprise a fluid-actuated slave cylinder with the piston rod thereof connected to the vehicle tie rod for movement therewith, a fluid-actuated drive cylinder with piston rod thereof connected to the auxiliary wheels and fluid lines interconnecting the two cylinders so that, as the piston rod of the slave cylinder is moved in response to the steering movement of the front wheels, the piston rod of the drive cylinder is moved to turn the auxiliary wheels in the desired direction.

In one embodiment, means are provided for moving the auxiliary wheels to a centered or straight-ahead position in response to the axle member being moved from the operating position toward the retracted position. The centering means can comprise springs acting on the auxiliary wheels to move them from a turned position toward a straight-ahead position when the wheels are disengaged from the ground during movement of the axle member from the operating toward a retracted position. These springs also maintain the auxiliary wheels in a straight-ahead position while the wheels remain disengaged from the ground.

In one embodiment, the assembly includes a pair of laterally spaced, generally longitudinally extending arms having one end carrying the axle member and the other end pivotally mounted on the vehicle frame member for affording pivotal movement of the axle member between the operating and retracted positions. The actuation means includes means connected between the vehicle frame members and the arm for biasing the axle member toward the retracted position and inflatable air springs disposed between the bottom edge of each vehicle frame member and each arm at a location between the axle member and the pivot axis of the arm. The actuation means also includes means for selectively pressurizing the air springs to move the axle member from the retracted position to the operating position and for selectively de-pressurizing the air springs to permit the axle member to be returned to the retracted position by the biasing means.

BRIEF DESCRIPTION OF THE DRAWINGS

FIG. 1 is a side elevation view of a truck tractor incorporating an auxiliary wheel assembly of the invention with the auxiliary axle located forwardly of the drive wheels and shown in an operating position.

FIG. 2 is an enlarged, fragmentary, side elevation view of the auxiliary wheel assembly shown in the operating position.

FIG. 3 is a fragmentary, sectional view taken generally along line 3—3 in FIG. 2.

FIG. 4 is a sectional view taken generally along line 4—4 in FIG. 3.

FIG. 5 is a view similar to FIG. 2 showing the auxiliary wheel assembly in the retracted position.

FIG. 6 is a fragmentary, sectional view of the left portion of FIG. 3 with the auxiliary wheel assembly shown in the retracted position.

FIG. 7 is a fragementary side elevation view of a truck incorporating an auxiliary wheel assembly located at the rear of the truck.

FIG. 8 is a fragmentary, sectional view similar to FIG. 3 illustrating an alternate embodiment wherein the auxiliary wheels are operably connected to the truck tractor front wheels through a hydraulic actuation system.

FIG. 9 is a fragmentary, sectional view of the truck tractor front wheel axle assembly including a portion of the hydraulic actuation system.

FIG. 10 is a fragmentary, partially broken away, top view of the hydraulic actuation system for an auxilliary wheel assembly located forwardly of the drive wheels.

FIG. 11 is a fragmentary, partially broken away, top view of the hydraulic actuation system for an auxiliary wheel assembly located behind the drive wheels.

DESCRIPTION OF THE PREFERRED EMBODIMENT

Illustrated in FIG. 1 is a semi-trailer tractor 10 having a chassis 12 including a pair of laterally spaced, longitudinally extending frame members 14. The chassis 12 is supported for travel over the ground by front steering wheels 16 and by rear wheels 18 mounted on fixed axle and driven by a driveshaft (not shown) in the usual manner.

Mounted on the chassis 12 forwardly of the rear wheels 18 is an auxiliary wheel assembly 20 embodying the invention. The auxiliary wheel assembly 20 (FIGS. 2-6) includes a pair of laterally spaced, rearwardly extending arms 22 carrying a rigid, transversely extending axle member 24 on the outer ends. Each of the inner ends (i.e., the end opposite to the axle member 24) is mounted at 26 on a bracket 28 extending downwardly from each frame member 14 for pivotal movement of the axle member 24 between on operating position and a retracted position as descried below.

As best shown in FIG. 3, the axle member 24 has a generally U-shape and includes a central position 30 extending laterally outwardly beyond the frame members 14 and opposite outer end portions 32 which are upwardly offset from the central portion 30. Located on each of the outer end portions 32 of the axle member 24 is a king pin assembly 34 rotatably supporting an auxiliary wheel 36 including a rubber tire. The king pin assemblies 34 are arranged in the usual manner to permit steering movement of the auxiliary wheels 36. That is, each auxiliary wheel 36 is free to pivot about a vertical axis relative to the axle member 24. Each king pin assembly 34 includes a steering arm or link 38. The steering links 38 are connected together by a tie rod 40 so that the auxiliary wheels 36 turn together. Thus, the self-steering auxiliary wheels 36 follow the tractor 10 when curves and corners are being negotiated and scuffing of the auxiliary wheel tires is minimized.

A damping means preferably is provided for minimizing flutter or shimmy of the auxiliary wheels. In the specific construction illustrated, the damping means comprises a two-way, hydraulic cylinder 42 connected at the opposite ends to one of the steering links 38 and to the axle member 24. The cylinder 42 can be provided with a by-pass (not shown) including a flow restriction to improve its damping characteristics.

Means are provided for moving the axle member 24 between the operating position shown in FIG. 2 wherein the auxiliary wheels 36 are in engagement with the ground and the retracted position shown in FIG. 5 wherein the auxiliary wheels 36 are raised above the ground. In the specific construction illustrated, the axle member 24 is biased toward the raised or retracted position by a pair of heavy-duty, coiled compression springs 46, each mounted on a bracket 28 beneath a frame member 14 and connected to a flexible member, such as chain 48, which is attached to an arm 22 and guided over a cam 50. The springs 46 are compressed when the axle member 24 is moved to the operating position by applying a downward force on the arms 22 and expand towards their normal condition to return the axle member 24 from the operating position to the retracted position when the downward force on the arms 22 is released.

The axle member 24 is moved from the retracted position to the operating position, against the biasing force of the springs 46, by a pair of conventional air bags or air springs 52, each mounted between a frame member 14 and an arm 22 at a location of the chain attachment and the axle member 24. The air springs 52 are air-tight, bellows-like rubber elements and the interiors thereof are connected to a source of compressed air through a suitable air supply system including a control (not shown) for selectively energizing or pressurizing and de-energizing or de-pressurizing the air springs 52. When pressurized, the air springs 52 urge the arms 22 downwardly to bring the auxiliary wheels 36 into engagement with the ground and thereby transfer a portion of the load from the rear wheels 18 onto the auxiliary wheels 26.

The amount of load transferred to the auxiliary wheels 36 and the amount of shock absorption afforded by the air springs 52 can be varied by varying the pressure inside the air springs. When the air springs 52 are de-pressurized, the compression springs 46, acting through the chains 48 and the arms 22, return the axle member 24 and the auxiliary wheels 36 to the retracted position.

By virtue of the axle member 24 being U-shaped, it can be raised to a location with the central portion 30 against or immediately beneath the bottom edges 54 of the frame members 14 and the outer end portions 32 located above the bottom edges 54 of the frame members 14. The central portion 30 of the axle member 24 is shown spaced from the bottom edges 54 of the frame members 14. In actual practice the central portion 30 preferably is urged by the springs 46 against the bottom edges 54 of the frame members which then serve as a stop for the axle member 24. When the auxiliary wheel assembly 20 is in the retracted position, the rotational axes of the auxiliary wheels 36 are located above the bottom edges 54 of the frame members 14, thereby permitting the above-the-ground clearance of the auxiliary wheels to be up to 11-12 inches or more. This capability is particularly advantageous for situations where the truck is driven over uneven ground, such as at construction sites, with the auxiliary wheels assembly 20 in the retracted position.

The geometry of the arms 22 and their pivot points are arranged to permit the auxiliary wheels assembly 20 to be raised to the above-described position even though the air springs 52 are conveniently located beneath the frame members 14. That is, the arms 22 have a dog-leg shape with an upwardly inclined inner end portion 55 and the pivot point 26 is located some distance below the bottom edges 54 of the frame members 14. With this arrangement, the air springs 52 can be collapsed in a manner illustrated in FIG. 5 whereby they do not interfere with the axle member 24 being raised to a location where the central portion 30 is against or immediately adjacent to the bottom edges 54 of the frame members 14.

If the auxiliary wheels 36 are turned when the auxiliary wheel assembly 20 is retracted and remained turned when the auxiliary wheel assembly is moved back to the operating position, tire scuffing and/or damage to the assembly could occur before the auxiliary wheels straighten themselves during initial movement of the truck, particularly in the event the auxiliary wheels are severely turned. This condition is obviated by providing means for automatically returning the auxiliary wheels 36 to a centered or straight-ahead position in response to the auxiliary wheel assembly 20 being moved from the operating position toward the retracted position.

In the specific construction illustrated, such means comprises a pair of coiled tension springs 56, each connected at one end to a steering link 38 and at the opposite end to the axle member 24 through an adjustment bolt 58 including a nut 60. One of the springs 56 is stretched when the respective auxiliary wheel 36 is turned out and returns the outturned auxiliary wheel back to a straight-aheead position when the wheels are raised from contact with the ground. Since the auxiliary wheels 36 move together by virtue of being interconnected by the tie rod 40, the inturned auxiliary wheel is also returned to the straight-ahead position. As viewed in FIG. 3, the left spring 56 serves to center the auxiliary wheels 36 when they are turned to the left and the right spring 56 serves to center the auxiliary wheels 36 when they are turned to the right. The biasing force imposed on the auxiliary wheels 36 by the springs 56 is adjusted by tightening and loosening the nuts 60 on the adjustment bolts 58 as required to locate the auxiliary wheels 36 in a straight-ahead position.

In the embodiment illustrated in FIG. 7, the auxiliary wheel assembly 20a is constructed and operates in substantially the same manner as in the embodiment illustrated in FIGS. 1–6. The primary difference is that the auxiliary wheel assembly 20a is mounted on the rear of the truck chassis 12a and the axle member and the auxiliary wheels 36a are located behind the rear drive wheels 18a. The support brackets are mounted on the truck frame members 14a and the air springs are disposed between the truck frame members 14a and the arm members 22 as in the embodiment illustrated in FIGS. 1–6. Also, the axle member 30 preferably is U-shaped so that the auxiliary wheels 36a can be raised above the ground to the extent described above.

In the embodiment illustrated in FIGS. 1–6, the auxiliary wheels tend to turn in the opposite direction to the front wheels when the truck is being backed. In the embodiment illustrated in FIG. 7, the auxiliary wheels, because of being located behind the drive wheels, tend to turn in the same direction as the front wheels when the truck is being backed. Consequently, it is good practice to raise the auxiliary wheel assembly in order to avoid the possibility of the assembly becoming damaged in the event the auxiliary wheels become severely jack knifed.

In the alternate embodiment illustrated in FIGS. 8–11, this potential problem is obviated by connecting the auxiliary wheels to the front wheels of the truck tractor through a fluid-actuation system which is operable to move the auxiliary wheels in response to steering movement of the truck front wheels. More specifically, the fluid-actuating system includes a slave hydraulic cylinder 70 of conventional design housing a piston 71 carried on an externally extending piston rod 72 and having ports 74 and 76 on the opposite sides of the piston 71. The cylinder end 78 of the slave cylinder 70 is pivotally mounted on a bracket 80 fixably mounted on the truck tractor front axle 82 by welding, threaded fasteners or the like. The rod or outer end 84 of the piston rod 72 is pivotally mounted on a bracket or sleeve 86 fixably mounted on the tie rod 88 interconnecting the front wheels 16 of the truck tractor in the usual manner for steering.

Thus, the piston rod 72 of the slave cylinder 70 is extended and retracted in response to movement of the tie rod 88 during steering of the front wheels 16. As viewed in FIG. 9, the piston rod 72 is extended and retracted when the front wheels are turned to the left and right, respectively.

The actuating system also includes a drive hydraulic cylinder 90 of the coventional design housing a piston 91 carried on an externally extending piston rod 92 and ports 94 and 96 on the opposite sides of the piston 91. The cylinder end 98 of the drive cylinder 90 is pivotally mounted on a bracket 100 fixably mounted on the axle 30 of the auxiliary wheel assembly. The rod or outer end 102 of the piston 92 is pivotally connected to a steering link 38. Thus, extension and retraction of the drive cylinder 90 turns or steers both the auxiliary wheels 36 via the steering link 30 and the tie rod 40.

The sleeve 86 preferably is clamped onto the tie rod 88 by bolts or the like so that the actuating system can be added as a kit with little or no modification to existing parts.

In the specific embodiment illustrated in FIG. 10, the hydraulic actuating system is arranged for an auxiliary wheel assembly located forwardly of the truck tractor drive wheels 18 as illustrated in FIG. 1. More specifically, the slave cylinder 70 and the drive cylinder 90 are connected so that the auxiliary wheels 36 are turned in the same direction as the front wheels 16 in response to steering movement of the front wheels. This is accomplished by connecting the port 74 on the slave cylinder 70 to the port 96 on the drive cyliner 90 via a conventional flexible hydraulic line 104 and connecting the port 76 on the slave cylinder 70 to the port 94 on the drive cylinder 90 by a conventional flexible hydraulic line 106.

The slave cylinder 70, the drive cylinder 90 and the hydraulic line 104 and 106 are filled with a hydraulic fluid. When the front wheels 16 are turned to the left as viewed in FIG. 9, the slave cylinder piston rod 72 is moved inwardly. The slave cylinder piston 71 forces the hydraulic fluid out through the port 74, through the line 104 and into the drive cylinder 90 through the port 96, causing retraction of the drive cylinder piston rod 91 which turns the auxiliary wheels to the left as viewed in FIG. 8. An opposite action occurs when the front wheels 16 are turned to the right.

In the embodiment illustrated in FIG. 11, the hydraulic actuating system is arranged for an auxiliary wheel assembly located behind the rear wheels of the truck tractor as in FIG. 7. The slave cylinder 70 and the drive cylinder 90 are connected so that as the truck tractor front wheels 16 are turned for steering, the auxiliary wheels 36 are turned in the opposite direction to follow the rear wheels 18. In this case, the port 76 of the slave cylinder 70 is connected to the port 96 of the drive cylinder 90 by a hydraulic line 108 and the port 74 of the slave cylinder 70 is connected to the port 94 of the drive cylinder 90 by a hydraulic line 110.

When the hydraulic actuating system is used, there is no need for the centering springs 22 or the damping cylinder 42 shown in FIGS. 3 and 4. The auxiliary wheels 36 are turned with the front wheels 16 and, therefore, are maintained in the proper orientation. The drive cylinder 90 also serves as a damping means.

From the foregoing description, one skilled in the art can easily ascertain the essential characteristics of the invention and, without departing from the spirit and scope thereof, can make various changes and mofidication to adapt it to various applications. For instance, a hydraulic fluid can be used in place of compressed air to actuate the air springs and one or more conventional hydraulic-actuated cylinders can be used for raising and lowering the axle member.

I claim:

1. An auxiliary wheel assembly for a vehicle including a frame which has a pair of longitudinal frame member including a bottom edge and is supported on front steerable wheels and rear drive wheels, said assembly comprising a transverse axle member extending below the vehicle frame and having a generally U-shape with a central portion extending outwardly beyond the vehicle frame members and opposite outer ends upwardly offset from said central portion;

a king pin assembly on each of the outer end portions of said axle member;

an auxiliary wheel rotatably mounted on each of said king pin assemblies for steering movement;

means interconnecting said auxiliary wheels so they steer together;

means mounting said axle member on the vehicle frame for pivotal movement between an operating position wherein said auxiliary wheels are in engagement with the ground and a retracted position wherein said auxiliary wheels are raised above the ground and said central portion of said axle member is retracted to a position immediately adjacent the bottom edges of the vehicle frame members and rotational axes of said auxiliary wheels are located above the bottom edges of the vehicle frame member; and actuation means for moving said axle member between the operating and retracted positions.

2. An auxiliary wheel assembly according to claim 1 including fluid actuating means operably connecting said auxiliary wheels with said vehicle steerable wheels for steering said auxiliary wheels in response to steering movement of said vehicle steerable wheels.

3. An auxiliary wheel assembly according to claim 2 wherein said vehicle includes a pair of front wheels which are interconnected by a tie rod for steering; and said fluid actuating means includes a fluid cylinder filled with an actuating fluid and housing piston carried on an externally extending piston rod connected to said vehicle tie rod for reciprocative movement of said piston in response to steering movement of said vehicle steerable wheels, a fluid drive cylinder filled with said actuating fluid and housing a piston carried on an externally extending piston rod connected to said auxiliary wheels for steering said auxiliary wheels in response to reciprocative movement of said drive cylinder piston, and conduit means filled with said actuating fluid interconnecting said slave and drive cylinders in fluid communications such that reciprocative movement of said slave cylinder piston causes reciprocative movement of said drive cylinder piston.

4. An auxiliary wheel assembly according to claim 3 wherein
said axle member and said auxiliary wheels are located forwardly of the vehicle rear drive wheels; and
said slave and drive cylinders are interconnected so that, as said vehicle steerable wheels are turned for steering, said auxiliary wheels are turned in the same direction.

5. An auxiliary wheel assembly according to claim 3 wherein
said axle member and said auxiliary wheels are located behind the vehicle rear drive wheels; and
said slave and drive cylinders are interconnected so that, as said vehicle steerable wheels are turned for steering, said auxiliary wheels are turned in the opposite direction.

6. An auxiliary wheel assembly according to claim 1 including spring means connected to said axle member and to at least one of said auxiliary wheels for moving said axiliary wheels from a turned position to a straight-ahead position in response to said axle member being moved from the operating position toward the retracted position and for maintaining said auxiliary wheels in a straight-ahead position while retracted.

7. An auxiliary wheel assembly according to claim 1 wherein
said assembly includes a pair of laterally-spaced generally longitudinally extending arms having one end carrying said axle member and the other end pivotally mounted on the vehicle frame members to afford pivotal movement of said axle member between the operating and retracted positions; and
said actuation means includes
means connected between the vehicle frame members and said arms for biasing said axle member toward the retracted position,
an inflatable air spring disposed between the bottom edge of each vehicle frame member and each of said arms at a location between said axle member and the pivot axis of said arm, and
means for selectively pressurizing said air springs to move said axle member from the retracted position to the operating position against the biasing force of said biasing means and for selectively depressurizing said air springs to permit said biasing means to return said axle member from the operating position to the retraced position.

8. An auxiliary wheel assembly for a vehicle including a frame which has a pair of longitudinal frame members including a bottom edge and is supported by a pair of steerable front wheels interconnected by a tie rod and rear drive wheels, said assembly comprising
a transverse axle member extending below the vehicle frame members and having a generally U-shape with a central portion extending outwardly beyond the vehicle frame members and having opposie outer end portions upwardly offset from said central portion;
a king pin assembly on each of the outer end portions of said axle member;
an auxiliary wheel rotatably mounted on each of said king pin assemblies for steering movement;
a tie rod interconnecting said auxiliary wheels so they steer together;
a pair of laterally-spaced, generally longitudinally extending arm, each having one end carrying said axle member and the other end mounted on a vehicle frame member for pivotal movement of said axle member about an axis located below the bottom edges of the vehicle frame members between an operating position wherein said auxiliary wheels are in engagement with the ground and a retracted position wherein said auxiliary wheels are raised above the ground and said central portion of said axle member is retracted to position immediately adjacent the bottom edges of the vehicle frame members and the rotational axes of said auxiliary wheels are located above the bottom edges of the vehicle frame members;
actuation means for moving said axle member between the operating and retracted positions, said actuation means including means connected between the vehicle frame member and said arms for biasing said axle member toward the retracted position, an inflatable air spring disposed between the bottom edge of each vehicle frame member and each of said arms at a location between said axle member and the pivot axis of said arm, and means for selectively pressurizing said air spring to move said axle member from the retracted position to the operating position against the biasing force of said biasing means and for selectively depressurizing said air springs to permit said biasing means to return said axle member from the operating position to the retracted position;
a slave cylinder filled with an actuating fluid and housing a piston carried on an externally extending piston rod connected to said front wheel tie rod for reciprocative movement in response to steering movement of said front wheels;
a drive cylinder filled with said actuating fluid and housing a piston carried on an externally extending piston rod connected to said auxiliary wheels to steer said auxiliary wheels in response to reciprocative movement of said drive cylinder piston; and
conduit means filled with said actuating fluid and interconnecting said slave and drive cylinders in fluid communication such that reciprocative movement of said slave cylinder piston causes reciprocative movement of said drive cylinder piston.

9. An auxiliary wheel assembly for a vehicle including a frame which has a pair of longitudinal frame members including a bottom edge and is supported rear drive wheels, said assembly comprising
a transverse axle member extending below the vehicle frame members and having a generally U-shape with a central portion extending outwardly beyond the vehicle frame members and having opposite outer end portions upwardly offset from said central portion;
a king pin assembly on each of the outer end portions of said axle member;
an auxiliary wheel rotatably mounted on each of said king pin assemblies for steering movement;
a tie rod interconnecting said auxiliary wheels so they steer together;
a pair of laterally-spaced, generally longitudinally extending arms, each having one end carrying said axle member and the other end mounted on a vehicle frame member for pivotal movement of said axle member about an axis located below the bottom edges of the vehicle frame members between an operating position wherein said auxiliary wheels are in engagement with the ground and a retracted position wherein said auxiliary wheels are raised above the ground and said central portion of said axle member is retracted to a position immediately adjacent the bottom edges of the vehicle frame members and the rotational axes of said auxiliary wheels are located above the bottom edges of the vehicle frame members;

actuation means for moving said axle member between the operating and retracted positions, said actuation means including means connected between the vehicle frame member and said arms for biasing said axle member toward the retracted position, an inflatable air spring disposed between the bottom edge of such vehicle frame member and each of said arms at a location between said axle member and the pivot axis of said arm, and means for selectively pressurizing said air spring to move said axle member from the retracted position to the operating position against the biasing force of said biasing means and for selectively depressurizing said air spring to permit said biasing means to return said axle member from the operating position to the retracted position; and spring means connected to sais axle member and to at least one of said auxiliary wheels for moving said auxiliary wheels from a turned position to a straight-ahead position in response to said axle member being moved from the operating position toward the retracted position and for maintaining said auxiliary wheels in a straight-ahead position while said axle member is in the retracted position.

* * * * *